United States Patent
Lewis et al.

[15] 3,690,033
[45] Sept. 12, 1972

[54] TRELLIS ARM POST

[72] Inventors: Leo J. Lewis; William L. Lewis; Mark T. Lewis, all of R.D. #4, North East, Pa. 16428

[22] Filed: June 1, 1970

[21] Appl. No.: 41,960

Related U.S. Application Data

[63] Continuation-in-part of Ser. No. 708,164, Feb. 26, 1968, abandoned.

[52] U.S. Cl. ..................................................47/46
[51] Int. Cl. .............................................A01g 17/06
[58] Field of Search .....................47/44–47, 42–43

[56] References Cited

UNITED STATES PATENTS

| | | |
|---|---|---|
| 941,894 | 11/1909 | Stetson.........................47/46 |
| 2,462,442 | 2/1949 | Wallace.....................47/42 X |
| 2,941,767 | 6/1960 | Mogey.......................47/42 X |
| 3,337,988 | 8/1967 | Burton..........................47/46 |
| 3,391,491 | 7/1968 | Daly.............................47/46 |
| 3,419,998 | 1/1969 | Burton..........................47/46 |

*Primary Examiner*—Robert E. Bagwill
*Attorney*—Charles L. Lovercheck

[57] ABSTRACT

Disclosed herein is a support for grape vines for use in a vineyard where a grape picking machine is to be used. The supports are for use on spaced rows of spaced posts. Each post has arms extending laterally outward from each side. The arms are swingably supported so that they can be swung up and down by grape picking machines, thereby shaking off the grapes onto a receiving member below the arms. The arms are made from sheet metal bent into the form of an inverted channel. The wires are received in slots in the distal end of the arm and are supported on the arms by means of hairpinlike clips in the arms that pass under the wires.

In the harvesting of grapes, machines are frequently used that pass under the grape vines and shake the vines to shake the berries off onto a conveyor belt or the like. The present invention provides an improved type of arm that can be easily swung up and down without being damaged and without damaging the grape vines.

2 Claims, 12 Drawing Figures

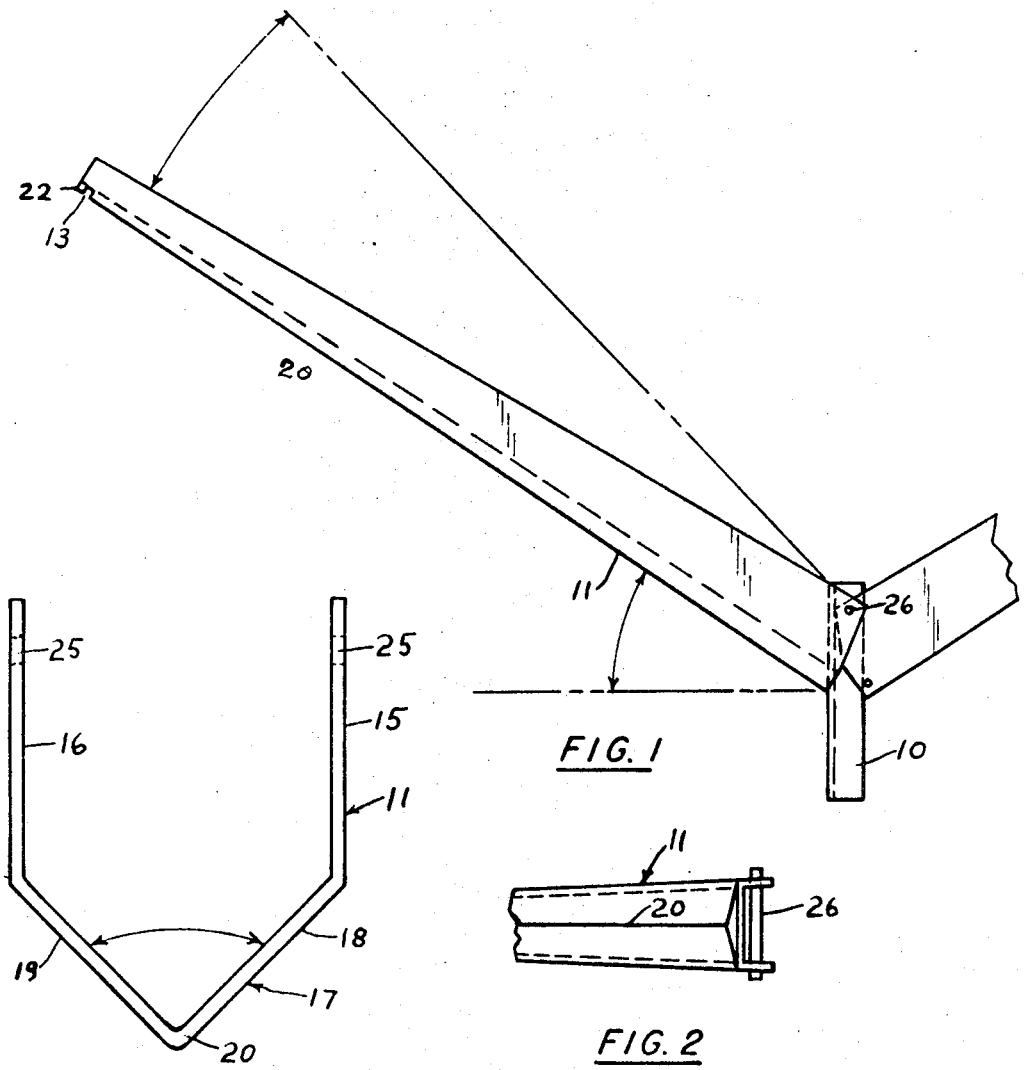
FIG. 1
FIG. 2
FIG. 3
FIG. 4
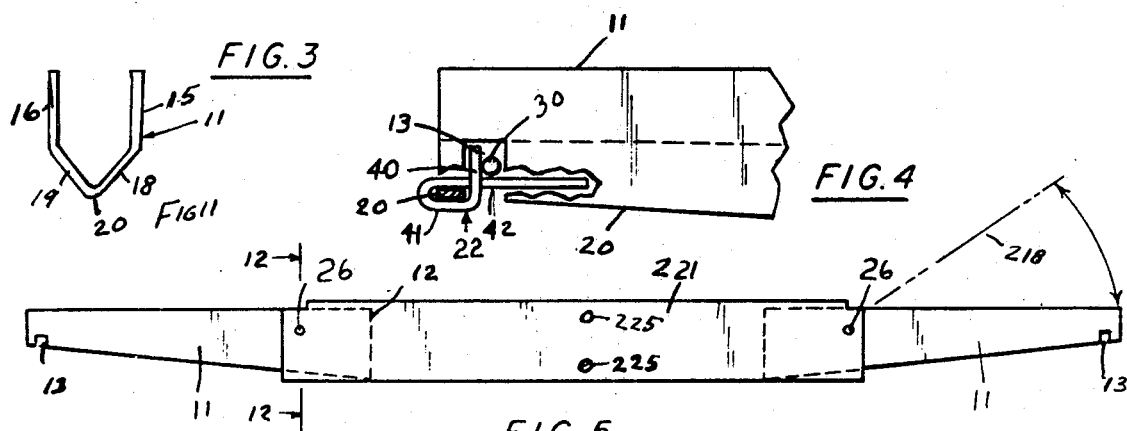
FIG. 5
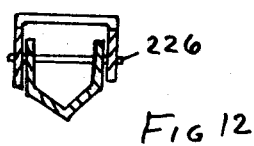
FIG. 12
INVENTOR.
LEO J. LEWIS
WILLIAM L. LEWIS
MARK T. LEWIS
BY Charles L. Loverkeck
attorney

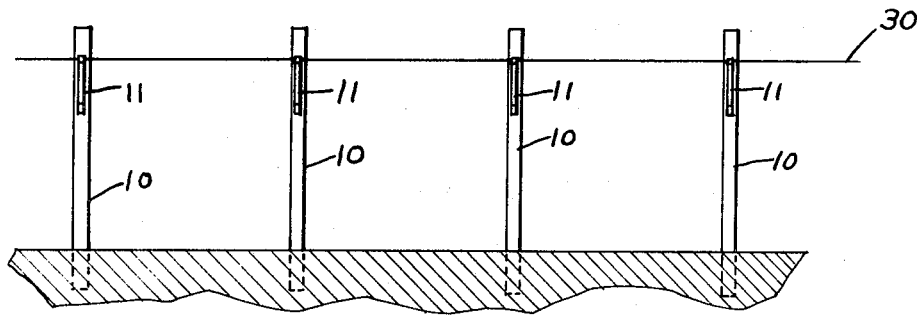
FIG. 6
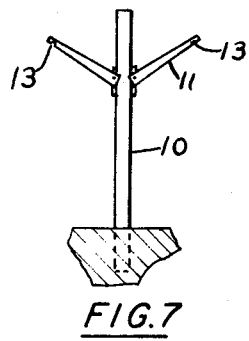
FIG. 7
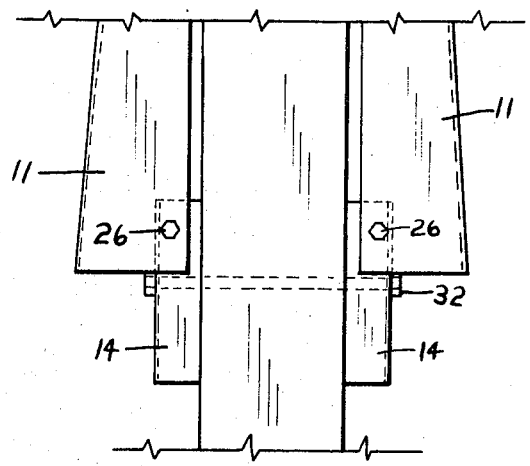
FIG. 8
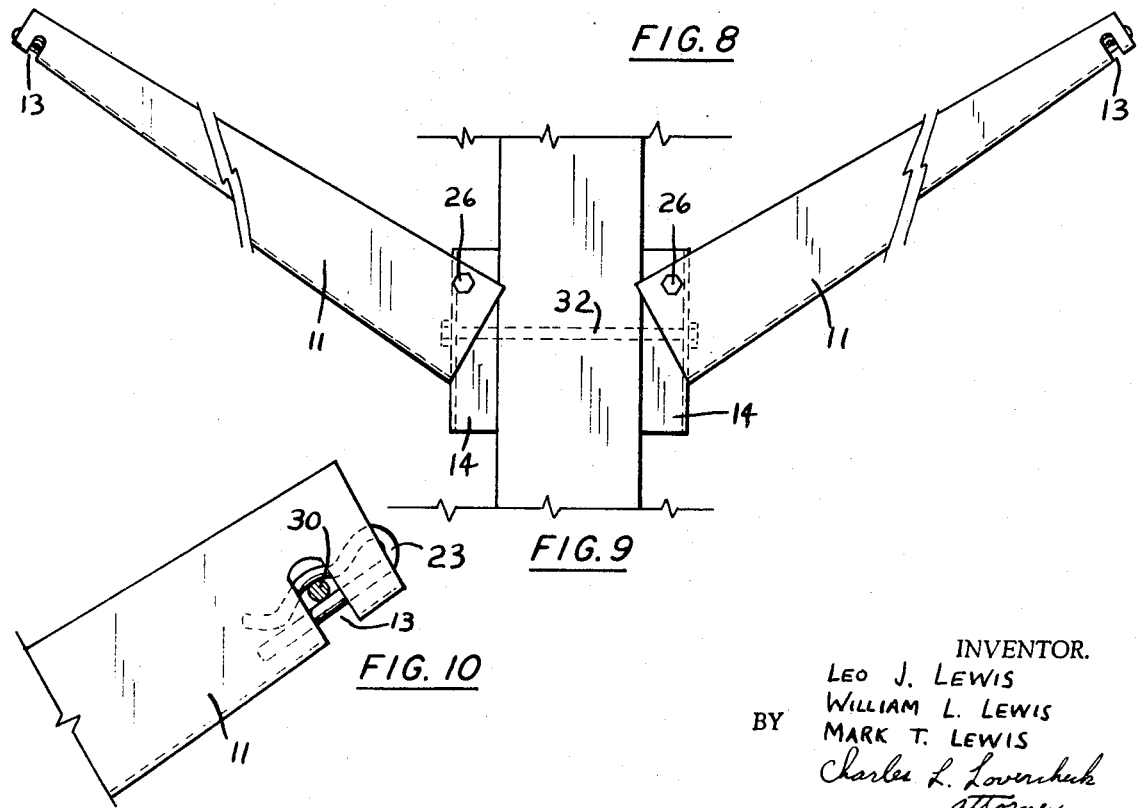
FIG. 9
FIG. 10
INVENTOR.
LEO J. LEWIS
WILLIAM L. LEWIS
BY MARK T. LEWIS
Charles L. Lovercheck
attorney

TRELLIS ARM POST

REFERENCE TO CO-PENDING APPLICATION

This application is a continuation-in-part of Ser. No. 708,164, which was filed on Feb. 26, 1968, entitled "- Trellis Arm post", and now abandoned.

OBJECTS OF THE INVENTION

It is, accordingly, an object of the invention to provide an improved vine support.

Another object of the invention is to provide a vine support that is simple in construction, economical to manufacture and simple and efficient to use.

Another object of the invention is to provide an improved arm for a vine support.

With the above and other objects in view, the present invention consists of the combination and arrangement of parts hereinafter more fully described, illustrated in the accompanying drawings and more particularly pointed in the appended claims, it being understood that changes may be made in the form, size, proportions, and minor details of construction without departing from the spirit or sacrificing any of the advantages of the invention.

DESCRIPTION OF THE DRAWINGS

FIG. 1 is a partial view of the vine support according to the invention showing the arms swung to their operative position and broken lines showing the arm swung to an upward position.

FIG. 2 is a top view of the vine support arm shown in FIG. 1 and removed from the post.

FIG. 3 is an end view of the vine support arm taken from the large end.

FIG. 4 is an enlarged side view of the outer end of the arm.

FIG. 5 is a view of another embodiment of the invention, showing the arms 11 supported on a cross arm like the cross arm of a telephone pole.

FIG. 6 shows a row of posts having vine support arms attached to brackets on their sides.

FIG. 7 is a side view of one of the posts shown in FIG. 6.

FIG. 8 is an enlarged partial view of the embodiment shown in FIGS. 6 and 7.

FIG. 9 is another partial view of the embodiment shown in FIGS. 6, 7, and 8.

FIG. 10 is an enlarged broken line view of the embodiment of the arm shown in FIGS. 6 through 9.

FIG. 11 is an end view of the arm shown in the embodiment of FIG. 1.

FIG. 12 is a cross sectional view taken on line 12—12 of FIG. 5.

DETAILED DESCRIPTION OF THE DRAWINGS

Now with more particular reference to the drawings, the embodiment of FIGS. 1 through 4 and 11 shows spaced posts 10, shown by way of example, supported in the ground as shown and carry wires 30 which are of the type commonly found in vineyards to support grape vines or the like. The wires 30 are supported at the ends of the arms 11 in slots 13 which extend upward into the arms through the apex 20. The arms 11 have holes 25 that receive bolts 26 which swingably attach the arms 11 to the posts 10 as shown in FIG. 1.

The arms 11 are in the form of inverted channels and are tapered and taper in cross sectional size from the end fixed to the post to the distal end. Arms 11 have inclined legs 18 and 19 connected together at apex 20 and have straight legs 15 and 16 integrally attached to the inclined legs 18 and 19 as shown.

The clips 22 are generally in the form of a hairpin having a straight leg 42 and a bent leg 41. Bent leg 41 has its end 40 bent at right angles to the leg portion so that the straight leg 42 extends into the end of the channel and the end 40 extends through the slots 13 and rests in the apex channel. The material of the channel adjacent the end of the arm 11 is received within the hairpin clip and end 40 extends up into slots 13. Thus the end 40 prevents the wire 30 from moving out of the slot 13.

In the embodiment of the invention shown in FIG. 5, the cross arms 221, which are another form of inverted channels and are attached to posts in a vineyard by means of bolts extending through holes 125. The arms 11 are similar to those shown in FIGS. 1 through 4. The cross arms are in the form of an inverted channel and a hole adjacent each of its ends receives the bolts 26. The outer ends of the arms 11 can swing upwardly to the phantom line position 218. The opposite ends engage the inside of the channel. The arms 11 have slots 13 at their outer ends which may receive wires such as the grape vineyard wires shown in the other embodiments of the invention, retained in place by suitable clips.

In the embodiment of the invention shown in FIGS. 6 through 10, the posts 110 are supported on arms 111. The arms 11 are constructed similar to the arms 11 shown in the embodiments of FIGS. 1 through 5 and have slots 13 adjacent their distal ends which receive the wires 130. The wires are retained in the slots 113 by clips 123. The clips 123 are of a type that will be familiar to those skilled in the art, which are in the form of a hairpin having a straight leg 142 and a curved leg 141. The curved leg 141 has a curve in it as shown which receives the wire 130 and the curved portion 143 of the leg rests on leg 141 and prevents the pin from sliding in the slot. The brackets 114 are retained to the posts 110 by bolts 132.

The foregoing specificaton sets forth the invention in its preferred practical forms but the structure shown is capable of modification within a range of equivalents without departing from the invention which is to be understood is broadly novel as is commensurate with the appended claims.

In the embodiments of the invention in which an exclusive property or privilege is claimed are defined as follows:

1. A vine supporting means for a vineyard comprised of an arm and a post wherein said arm is comprised of a channel defined by parallel legs extending in parallel planes and connected together by a V-shaped bottom, said arm having a first end tapering to a smaller second end, and apertures in the first end legs and remote from said V-shaped bottom, a slot in said V-shaped bottom adjacent said second end, said slot receiving a grape wire and a U-shaped clip extending longitudinally of said arm and lying in said V-shaped bottom and resiliently receiving said wire, said post receiving said first end legs and a pin extending through said apertures in said channel legs and through said post, said V-shaped bottom being adapted to engage said post for limiting the downward swinging movement of said arm, said arm being free to pivotally move upwardly.

2. The combination recited in claim 1 wherein said arm inclines upward and away from said post.

* * * * *